United States Patent [19]

D'Auria

[11] Patent Number: 5,107,098

[45] Date of Patent: Apr. 21, 1992

[54] PROFILED SHEATHED WIRE FOR FORMING INTO AN ELECTRIC RESISTANCE WELDING INSERT

[75] Inventor: Vincent S. B. D'Auria, Cap d'Ail, France

[73] Assignee: Boulet d'Auria Terlizzi and Gaz de France, France

[21] Appl. No.: 532,451

[22] Filed: Jun. 4, 1990

[30] Foreign Application Priority Data

Jun. 9, 1989 [FR] France .............................. 89 07648

[51] Int. Cl.⁵ ............................................. H05B 3/58
[52] U.S. Cl. ................................. 219/548; 219/535; 219/544; 219/549
[58] Field of Search .............. 219/535, 548, 517, 544, 219/549, 528, 541, 522, 550; 285/22, 286; 264/272.11

[56] References Cited

U.S. PATENT DOCUMENTS

| | | | |
|---|---|---|---|
| 3,378,672 | 4/1968 | Blumenkranz | 219/544 |
| 3,679,531 | 7/1972 | Wienand et al. | 219/544 |
| 4,436,988 | 3/1984 | Blumenkranz | 219/544 |
| 4,894,521 | 1/1990 | Evans | 219/544 |

FOREIGN PATENT DOCUMENTS

| | | |
|---|---|---|
| 1337887 | 8/1962 | France . |
| 2083363 | 1/1971 | France . |
| 2356765 | 6/1977 | France . |
| 2461872 | 7/1979 | France . |
| 2522457 | 3/1983 | France . |
| 450706 | 1/1966 | Switzerland . |
| 2137298 | 10/1984 | United Kingdom . |

OTHER PUBLICATIONS

Patent Abstracts of Japan, vol. 8, No. 154, Jul. 18, 1984, JP-A-59 49 945 (Sanyo Denki).

Primary Examiner—Bruce A. Reynolds
Assistant Examiner—Michael D. Switzer
Attorney, Agent, or Firm—Andrus, Sceales, Starke & Sawall

[57] ABSTRACT

A wire-form element consists of at least one resistive wire coated with a thermoplastic material. The coating features mechanical fixing parts one of which is designed to cooperate with the other fixing part of an adjacent identical wire-form element to be joined to it. The wire form element further comprises a second heating wire tangential to the contacting surface of the wire form element to be joined to it. This second heating wire is used to stiffen the connector or the insert obtained by welding together the joined wire-form element sections. The wire-form element is particularly intended for the manufacture of electric resistance welding inserts. In the case of inserts intended for a welding sleeve for jointing tubular thermoplastics material parts it is preferably formed into a helical winding. In the case of inserts intended for making a branch connection to a tubular plastics material part by making a hole therein it may be formed into a flat spiral.

15 Claims, 2 Drawing Sheets

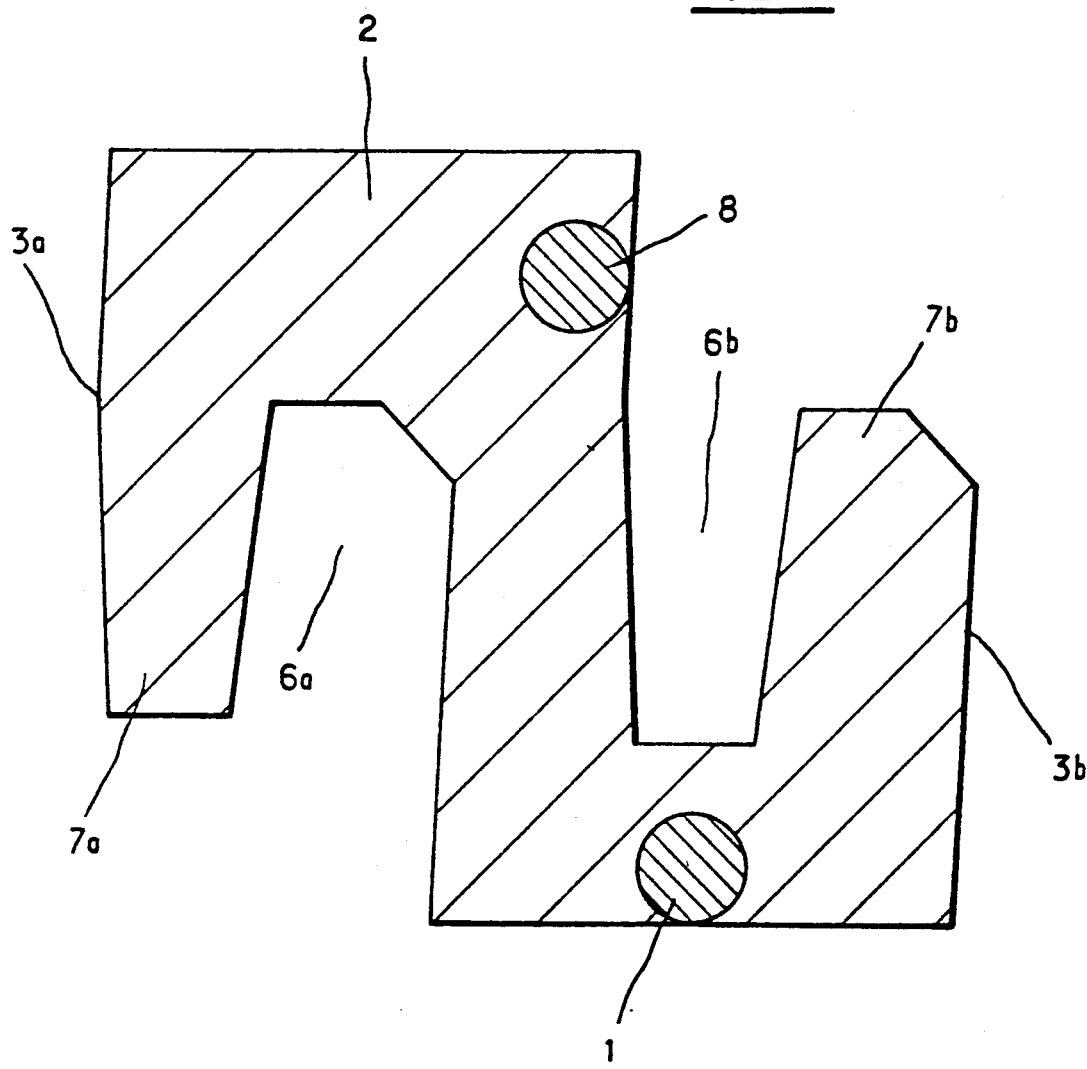

PROFILED SHEATHED WIRE FOR FORMING INTO AN ELECTRIC RESISTANCE WELDING INSERT

BACKGROUND OF THE INVENTION

1. Field of the Invention

The present invention relates to a profiled sheathed resistive wire which can be attached in various ways to an adjacent like wire. This wire is particularly intended for forming a heating insert for electric resistance welding plastics material pipes, such as gas distribution pipes which are usually made from high-density polyethylene.

2. Description of the Prior Art

The electric resistance welding technique consists in using a heating wire embedded in a connecting part and forming an electrical resistance to heat the contacting surfaces of the parts to the temperature at which the materials weld.

The usual technique employed for forming such connecting parts (or connectors) is overmolding by injection molding. The heating wire is placed in a spool which is overmolded to form the connecting part. The wire is therefore relatively near the inside surface of the element. To achieve good quality welding it is desirable for the wire to be as near as possible to this inside contact surface.

The fabrication of this sleeve, to be subsequently overmolded, is therefore a major process in the manufacture of electric resistance welding connectors.

As a general rule the wire is wound directly onto the relatively thin sleeve and fixed by heating the wire, for example (GLYNWED TUBES AND FITTINGS LIMITED European patent 0303 909), or inserted into a helical groove preformed on the sleeve (WAVIN European patent 0262 735).

It has also been proposed to form prefabricated inserts (or preforms) from sheathed wire.

This is the case with the electric resistance welding connector of European patent 0036 963 (GEORG FISHER AKTIEN GESELLSCHAFT) in which a cylindrical coated wire is wound into a helix and the coating of each turn is solidly welded to the coating of the next turn during the fabrication of the winding, to form a compact bush.

It is also an insert of this type which is described in French patent 2 503 020 (SERAP), in which a sheathed wire is wound with contiguous turns onto an expandable mandrel, the wire is heated sufficiently for the sheath to soften and the mandrel is expanded by a conical core so that the outside surface of the mandrel is practically in contact with a generatrix of the resistive wire. In this way the turns are welded together to produce a sleeve intended to be inserted into an electric resistance welding connector.

In another technique disclosed in French patent 2 040 143 (GERBERT et Cie), the heating conductor is a strip of plastics material on which the heating wire is disposed in separated turns. This heating conductor is then introduced between the tubes to be jointed.

Heating inserts are also used in connecting parts employed to make a branch connection by forming a hole in situ in a pipe.

Connecting parts of this kind are usually in two parts receiving the pipe. The hole is formed after heat welding the pipe in the area in which the hole is to be made, by means of an electrical heating element.

In a similar way to the case of the connecting sleeve, attempts have been made to produce a prefabricated heating insert.

In the prior art described in French patent 2 171 223 (ROLLMAPLAST AG), for example, a sheathed resistive wire of spiral or other form is overmolded into the mass of the saddle part.

A prefabricated insert is described in French patent 2 519 578 (INNOVATION TECHNIQUE SAM); this insert is formed from a relatively thin molded plate incorporating a groove into which the spiral-form heating wire is placed; this insert is designed to be incorporated into the inside surface of the saddle, preferably during molding of the latter.

Prefabrication of these heating inserts allows large-scale series manufacture, guarantees high quality connecting parts and significantly facilitates the molding or overmolding process.

To summarize, this prefabrication is primarily achieved by first (before the connecting part itself is fabricated) connecting the heating wire to a plastics material base of appropriate shape or by welding the sheath of the wire direct to that of the adjacent wire by heating on an appropriate supporting surface.

These techniques produce parts of inserts specific to each application, that is to say sleeves in the case of conventional cylindrical joints and disks or plates in the case of perforation joints, and also specific to each diameter of the tubular members to be jointed.

The object of the invention is to combine the advantage of prefabrication with that of a multifunction wire that can be used for multiple applications.

SUMMARY OF THE INVENTION

To this end the present invention consists in a wire-form element comprising at least one resistive wire coated with a thermoplastics material in which the coating has conjugate shape profile parts on opposite sides of the wire-form element to constitute mechanical fixing parts one of which is designed to be nested in and so fixed to the other fixing part of an adjacent identical wire-form element to be joined to it, and a second covered heating wire tangential to a contacting surface of two wire-form element sections to be joined together and adapted to enable the joined wire-form element sections to be welded together.

This sheathed wire may therefore be manufactured in long lengths, in the same way as a conventional cylindrical sheathed wire, and may be any shape or size.

Its fixing arrangement is particularly simple and the manufacturing cost of inserts of this type is therefore relatively low, as no specific and complex molding, heating or fitting equipment is required.

In accordance with the invention, the wire-form element is therefore constituted by at least one resistive wire coated with a thermoplastics material and it is characterized in that the coating incorporates mechanical fixing parts, one of which is designed to cooperate with the other fixing part of an adjacent identical wire-form element to be assembled to it.

The mechanical fixing parts are preferably conjugate shape profiled parts on opposite sides of the wire-form element and fixed together by nesting inside each other. This mode of fixing is particularly simple to implement and the wire-form element can be extruded without requiring complex equipment.

In one embodiment these conjugate shape parts may be profiled parts, male on one side of the element and female on the other side, dovetail shape parts, for example.

In another embodiment these fixing parts each comprise a male part and a female part, nested inside each other by vertical thrust; in this latter case they may have a trapezoidal cross-section groove and these grooves may be provided on at least one internal surface with retaining ribs.

These two embodiments are given by way of example only since, of course, these profiled parts may be made with other shapes enabling nesting and snap-fastening. These various shapes allow easy adaptation to the shape of inserts to be obtained. Depending on the shape of the insert, it may be more advantageous to perform the nesting by simple lateral thrust, by vertical thrust or by a combination of the two.

To enable the manufacture of inserts requiring the wire-form element to be curved, for example wound into a spiral to form a circular disk, the wire-form element may be provided with lateral cut-outs. Larger bevelled cut-outs may also be considered for achieving sharp bends.

The wire-form element therefore has a generally rectangular shape cross-section and the resistive wire is as close as possible to one of its surfaces, being preferably flush with one of its surfaces. As explained above, a flush heating wire provides optimum quality welding of the surfaces in contact.

The wire-form element may advantageously further comprise at least a second heating wire tangential to one of the contacting surfaces of two joined wire-form element sections. In this way the stiffness of the element made from at least one wire-form element as described is improved by electric resistance welding.

This wire-form element is intended in particular for manufacturing electric resistance welding inserts.

In the case of inserts intended for sleeves for jointing two tubular thermoplastics material parts it will preferably be assembled into a helical winding.

In the case of inserts intended for branch connections entailing making a hole in a thermoplastics material tubular part it will preferably be assembled into a spiral in order to form a circular disk.

Another preferred use for the wire-form element in accordance with the invention consists in electric resistance welding pipes by winding said wire-form element onto the pipe(s) and applying a voltage to the heating wire(s) to repair or joint the pipes. The main advantage of this application is that it allows simple, fast and reliable welding of pipes using a single product and routine electrical devices.

The invention is described in more detail hereinafter with the assistance of drawings showing only one embodiment.

BRIEF DESCRIPTION OF THE DRAWINGS

FIG. 3 shows in cross-section a preferred embodiment of the wire-form element.

DETAILED DESCRIPTION OF THE INVENTION

Figure 1:
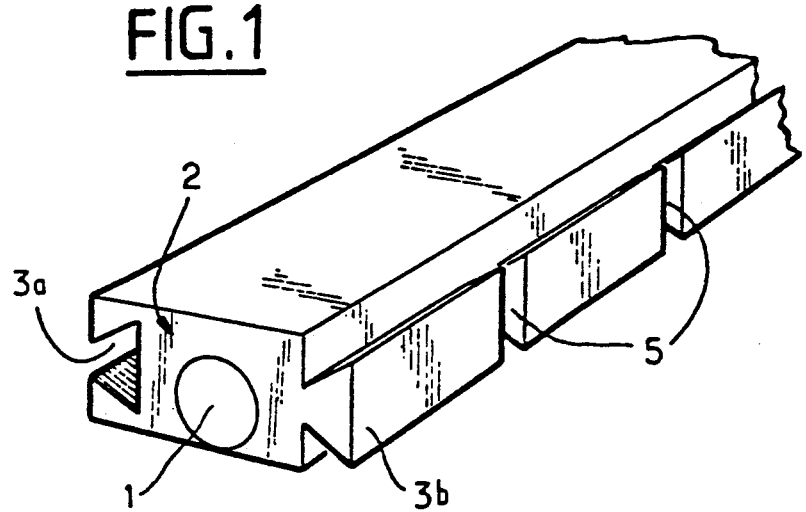
FIGS. 1 and 2 show in perspective two embodiments of wire-form elements in accordance with the invention.
Figure 2:
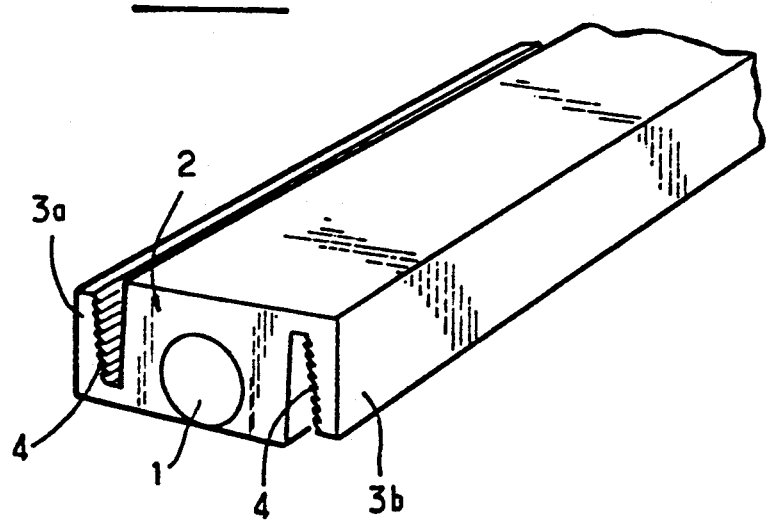

FIGS. 1 and 2 show two wire-form elements of generally rectangular cross-section formed by a resistive wire 1 coated with a plastics material sheath 2, in this instance a polyethylene sheath. As can be seen on their cross-section, the resistive wire 1 has a generatrix flush with one surface of the section that will be referred to hereinafter as the lower surface.

The lateral surfaces of the wire-form element are provided with mechanical fixing parts 3a, 3b. In the examples shown these mechanical fixing parts are profiled parts adapted to cooperate through their conjugate shape, by nesting or snap-fastener fashion, with the corresponding parts of an adjacent wire-form element section.

In FIG. 1 the profile parts comprise a female part 3a and a male part 3b of conjugate shape; in the example shown they are dovetail-shape but they can equally well be semi-cylindrical or any other shape enabling easy snap-fastening.

Cut-outs 5 may be provided on at least one lateral surface of the wire-form element to facilitate curving or bending the element.

In FIG. 2 the profiled parts are identical but symmetrical relative to the longitudinal axis of the wire-form element, these profiled parts 3a, 3b forming a kind of hook designed to nest one within the other. In the example shown these hook parts are formed by trapezoidal cross-section grooves which have on their inclined internal surfaces ribs 4 designed to lock them together when nested. The shape and the cross-section of these grooves can obviously be different, for example rectangular or triangular.

The wire-form element as previously described may comprise a number of parallel wires instead of a single resistive wire 1, the wire-form element then being wider. However, the number of resistive wires 1 is limited by the need to be able to shape the elements as required.

FIG. 3 shows in cross-section a preferred embodiment of the wire-form element.

In this embodiment at least one heating wire 1 is embedded in a plastics material sheath 2 comprising two conjugate shape parts 3a, 3b designed to be nested by vertical translation.

Each nesting part 3a or 3b has a female part 6a or 6b and a male part 7a or 7b.

Each female part 6a, 6b is in the form of a groove open upwards or downwards. The female part 6a of the nesting part 3b has a shape in cross-section analogous to the male part 7b of the other nesting part 3b and the male part 7a of the nesting part 3a has a shape in cross-section analogous to the female part 6b of the nesting part 3b. The cross-section of the wire-form element is therefore generally S-shape, as seen here turned through 90°.

The heating wire 1 is tangential to the surface of the sheath intended to be in contact with the surface of one or more tubular elements to be jointed. The heating wire 1 is preferably placed under one of the female parts 6a or 6b.

This wire-form element may optionally comprise at least a second heating wire 8 tangential to one of the contacting surfaces of joined wire-form element sections, preferably (as shown in FIG. 3) tangential to the inside surface of the female part 6a or 6b, at a specific distance from the surface opposite the surface designed to be in contact with the tubular elements to be jointed.

The second heating wire 8 is used to stiffen the connector or the insert obtained by welding together the joined wire-form element sections.

The wire-form element may be fabricated by extruding polyethylene around the resistive wire(s).

It is particularly intended for the production of electric resistance welding inserts of varied size and shape.

In the case of an electric resistance welding insert for a welding sleeve for jointing tubular plastics material parts it may be formed into a helical winding.

In the case of an electric resistance welding insert for making a branch connection by making a hole in a pipe it may be formed into a spiral to form a circular disk.

The wire-form element is manufactured in long lengths and can be cut and formed into various shapes by virtue of the cut-outs 5 or possibly by making cuts as necessary.

Another very interesting application of this electric resistance welding wire-form element is the in situ repair or jointing of pipes.

The repairer winds a length of profiled sheathed wire as previously described around the pipe(s), possibly in more than one layer. The appropriate voltage is then applied to carry out the welding.

To this end the wire may be supplied with tables or the like enabling the operator to apply the appropriate voltage for the appropriate time.

A first type of table gives the welding time as a function of the applied voltage and the diameter of the pipe(s). In this case the sheathed wire may be provided with visual marks at precise lengths so that the wire can be quickly cut to the length required for the pipe diameter.

A second type of table gives the welding time as a function of the applied voltage and the resistivity of the winding.

The wire-form element in accordance with the present invention therefore forms a practical and reliable product that is ready to use for welding pipes and whose use requires only routine electrical equipment (ohmmeter, battery, transformer, etc).

There is claimed:

1. Wire-form element comprising at least one resistive wire coated with a thermoplastics material in which the coating has conjugate shape profile parts on opposite sides of the wire-form element to constitute mechanical fixing parts one of which is designed to be nested in and so fixed to the other fixing part of an adjacent identical wire-form element to be joined to it, and a second covered heating wire in said wire-form element tangential to a contacting surface of two wire-form element sections to be joined together and adapted to enable the joined wire-form element sections to be welded together.

2. Wire-form element according to claim 1 wherein said profiled fixing parts are male parts and female parts.

3. Wire-form element according to claim 1 wherein said profiled fixing parts each comprise a male part and a female part adapted to nest inside each other as the result of a vertical thrust.

4. Wire-form element according to claim 3 wherein said female part of one of said fixing parts has a shape in cross-section analogous to that of said male part of the other fixing part.

5. Wire-form element according to claim 1 wherein said at least one resistive wire has a generatrix flush with a surface of the profile which is not a contacting surface of two wire-form element sections to be joined together.

6. Wire-form element according to claim 3 wherein said at least one resistive wire has a generatrix flush with a surface of the profile disposed underneath one of the female parts.

7. Wire-form element according to claim 3 wherein said second heating wire is tangential to the inside surface of the female parts.

8. Wire-form element according to claim 1 provided with lateral cut-outs.

9. Electric resistance welding insert for a welding sleeve for jointing tubular thermoplastics material parts made from at least one wire-form element comprising at least one resistive wire coated with a thermoplastics material in which the coating has conjugate shape profile parts on opposite sides of the wire-form element to constitute mechanical fixing parts one of which is designed to be nested in and so fixed to the other fixing part of an adjacent identical wire-form element to be joined to it, and a second covered heating wire in said wire-form element tangential to a contacting surface of two wire-form element sections to be joined together and adapted to enable the joined wire-form element sections to be welded together.

10. Electric resistance welding insert according to claim 9 made by forming a wire-form element into a helical winding.

11. Electric resistance welding insert according to claim 9 wherein said second heating wire is spaced from the surface opposite the surface adapted to contact the tubular elements to be jointed.

12. Electric resistance welding insert for making a branch connection to a tubular thermoplastics material part by making a hole therein, made from at least one wire-form element comprising at least one resistive wire coated with a thermoplastics material in which the coating has conjugate shape profile parts on opposite sides of the wire-form element to constitute mechanical fixing parts one of which is designed to be nested in and so fixed to the other fixing part of an adjacent identical wire-form element to be joined to it, and a second covered heating wire in said wire-form element tangential to a contacting surface of two wire-form element sections to be joined together and adapted to enable the joined wire-form element sections to be welded together.

13. Electric resistance welding insert according to claim 12 made by assembling a wire-form element into a spiral.

14. Method for in situ electric resistance welding of at least one pipe, comprising:
providing a wire-form element including at least one resistive wire coated with a thermoplastics material in which the coating has conjugate shape profile parts on opposite sides of the wire-form element to constitute mechanical fixing parts one of which is designed to be nested in and so fixed to the other fixing part of an adjacent identical wire-form element to be joined to it, and a second covered heating wire in said wire-form element tangential to a contacting surface of two wire-form element sections to be joined together to enable the joined wire-form element sections to be welded together;
winding a length of said wire-form element around at least one pipe such that the wire-form element is in contact with said at least one pipe and
applying a voltage to said at least one resistive wire to weld said wire-form element to said at least one pipe.

15. The method of claim 14, further comprising:
joining in nested form one of said mechanical fixing parts of the wire-form element to a mechanical fixing part on the adjacent wire-form element; and
applying a voltage to said second heating wire to weld together said joined wire-form elements.

* * * * *